United States Patent [19]

Sakurazawa

[11] 4,057,377
[45] Nov. 8, 1977

[54] APPARATUS AND METHOD FOR NOODLE ROLLING

[76] Inventor: Hatuo Sakurazawa, 15 banchi, Sinozuka, Fujioka, Gunma, Japan

[21] Appl. No.: 686,720

[22] Filed: May 17, 1976

[51] Int. Cl.$^2$ .............................................. A21C 3/02
[52] U.S. Cl. .................................... 425/135; 425/294; 425/363; 425/367
[58] Field of Search ............... 425/337, 367, 366, 374, 425/199, 294, 135, 140

[56] References Cited

U.S. PATENT DOCUMENTS

| 719,116 | 1/1903 | Hueg | 425/374 X |
| 1,987,237 | 1/1935 | Lanterbur et al. | 425/374 X |
| 2,165,718 | 7/1939 | Mun | 425/294 X |

FOREIGN PATENT DOCUMENTS

| 309,466 | 7/1933 | Italy | 425/199 |
| 494,899 | 6/1954 | Italy | 425/294 |
| 484,048 | 8/1953 | Italy | 425/294 |

*Primary Examiner*—Richard B. Lazarus
*Assistant Examiner*—W. R. Briggs
*Attorney, Agent, or Firm*—Arnold S. Weintraub

[57] ABSTRACT

The present invention teaches an apparatus and method for noodle rolling. The apparatus includes a plurality of roller sets vertically arranged one below the other. Each roller set has roller pairs facing each other. The roller gap of each roller set is shifted laterally with respect to the next lower roller set within a range corresponding to the distance between the pair of rollers in the next lower roller set. In this manner, the noodle strip is first guided by the roller periphery in the next lower set before entering the roller gap therein. The noodle strip formed in the uppermost set is progressively rolled through the succession of the following roller sets.

4 Claims, 2 Drawing Figures

APPARATUS AND METHOD FOR NOODLE ROLLING

BACKGROUND OF THE INVENTION

1. Field of the Invention

This invention relates to apparatus and methods for noodle rolling. More particularly, the present invention pertains to vertical type noodle rolling apparatus and methods wherein the noodle strip is progressively rolled as it is moved downwardly.

2. Prior Art

The prior art noodle rolling apparatus comprises a plurality of horizontally arranged roller sets each having roller pairs facing each other. Therefore, in leading the so-called "noodle strip", which is formed by feeding the noodle material from the first roller set to the next roller set, it was necessary, heretofore, to either carefully transport the tip of the noodle strip to the roller gap in the next roller set, by gripping or holding it, or using a special transferring means, such as belt conveyors.

However, where the tip of the noodle strip is manually transferred to the roller gap of the individual roller sets, the hands of the operator are liable to become entangled in the roller gap. Furthermore, the use of transferring means results in a higher cost and a larger space requirement, thus leading to a considerable increase in the cost of the product. However, since the noodle strip is soft as it is rolled, a method is required for transferring and supporting it between adjacent roller sets. Yet, quite often the noodle strip emerging from a roller set is folded as it enters the roller gap of the next roller set, thus, preventing uniform rolling. This tendency is most pronounced when the thickness of the noodle strip is reduced with progressive rolling. This not only results in unsatisfactory rolling but also results, in extreme cases, in the breakage of the noodle strip during rolling, thus, adversely affecting continuous production.

The present invention seeks to solve the aforementioned problems.

OBJECTS OF THE INVENTION

An object of the invention is to provide an apparatus for noodle rolling having a simple construction.

Another object of the invention is to provide an apparatus and method for noodle rolling permitting the production of noodles at low cost.

A further object of the invention is to provide an apparatus and method for noodle rolling which permits rolling of the noodle strip uniformly and satisfactorily while preventing breakage of the noodle strip during rolling.

Still another object of the invention is to provide an apparatus and method for noodle rolling which requires no special operation, such as setting the noodle strip on each roller set, thus, protecting the hands of the operator.

Still another object of the invention is to provide an apparatus and method for noodle rolling which requires little floor space for operation.

SUMMARY OF THE INVENTION

The present invention comprises a noodle rolling apparatus consisting of a plurality of vertically arranged roller sets and a method of noodle rolling using such apparatus. In other words, the apparatus and method according to the invention can be said to be of the vertical type.

According to the invention, noodle rolling is carried out with a plurality of roller sets arranged one below the other, wherein a noodle strip is progressively rolled downwardly to a desired thickness. With the vertical arrangement of roller sets the noodle strip emerges from the roller gap of an upper roller set directly downward and enters the roller gap in the roller set immediately beneath it.

The roller set hereof comprises roller pairs, as mentioned above. However, the individual roller sets vertically arranged one below another are pre-arranged and disposed such that the roller gap of each roller set is positioned within the range corresponding to the distance between the rollers in the next lower roller set. With this arrangement, the noodle strip emerging from the upper roller set can first be guided by the roller periphery in the next lower roller set so that it can reliably enter the roller gap therein.

In addition, by arranging the roller sets such that the roller gap of each roller set is laterally shifted with respect to the next lower roller set within a range corresponding to the distance between the rollers in the next lower roller set, the noodle strip emerging from the upper roller set can first be guided by the roller periphery in the next lower roller set before entering the roller gap. This prevents the noodle strip from entering the roller gap in a folded state, should sagging take place due to errors in the peripheral speed of the rollers or other causes, thus, ensuring uniform rolling, while preventing breakage of the noodle strip being rolled.

In each roller set, the peripheral speed of the rollers is basically controlled by detecting the sagging of the noodle strip by means of a sensor. To this end, the rollers in each roller set are coupled, via respective universal joints, to a speed control means controlled by the sensor. Further, the distance between the roller shafts in the roller set is made variable to permit adjustment of the roller gap.

For a more complete understanding of the present invention, reference is made to the following detailed description and accompanying drawing. In the drawing, like reference characters refer to like parts through the several views in which:

DESCRIPTION OF THE PREFERRED EMBODIMENT

Figure 1:
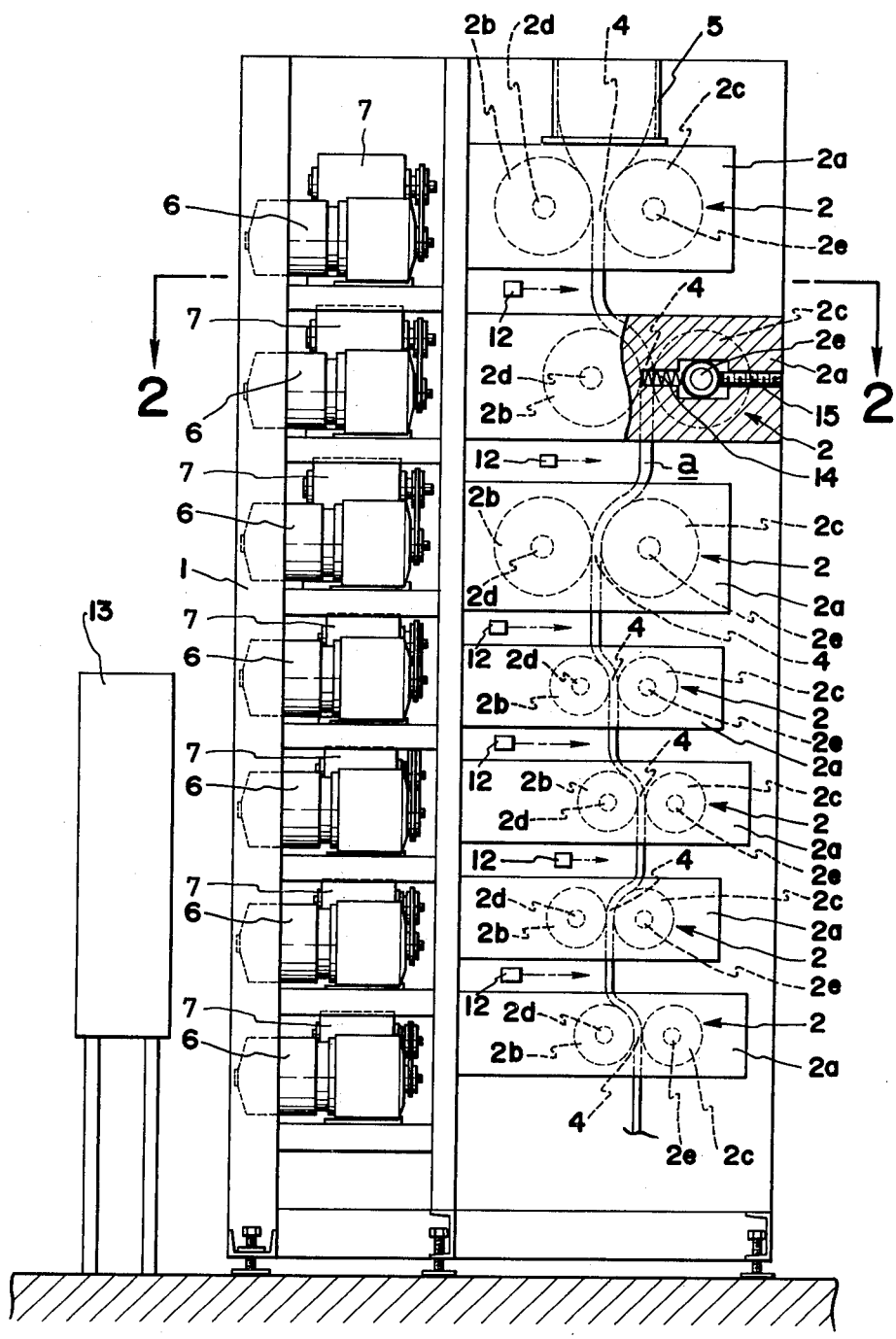
FIG. 1 is a front view showing a noodle rolling means.

At the outset, it should be noted that while vertical rolling is often practiced in case of conventional metal rolling, it is a novel practice insofar as an apparatus and method for noodle rolling is concerned. Particularly, the present apparatus fits itself to the physical properties of the noodle strip and permits the character of the noodle strip to be utilized for the rotational rolling thereof. The noodle is produced by kneading the wheat flour into a paste and rolling this material by roller pairs into a so-called "noodle strip".

Now, and with reference to the drawing, there is depicted therein an apparatus for noodle rolling in accordance with the present invention.

As shown in FIG. 1, the apparatus comprises a plurality of roller sets 2 which are mounted in the side walls of a vertically extending frame 1. Each roller set 2 comprises roller pairs 2b and 2c. The roller pairs 2b and 2c are mounted by, respective, shafts 2d and 2e in a rigid frame 2a such that the roller pairs face each other. The individual shafts 2d and 2e are provided with adjusting means for adjusting the distance between them. Each frame 2a is open at its top and bottom so that upper and lower portions of the rollers 2b and 2c are exposed and accessible.

As depicted in FIG. 1, the roller gap between the rollrs 2b and 2c of each roller set 2 is laterally shifted with respect to the roller sets immdiately above and below it, with a range distance corresponding to the interroller distance or roller gap of the immediate lower roller set. Preferably, the range corresponds to the distance between the roller shafts 2d and 2e of the next lower roller set.

The rollers 2b and 2c of the upper roller sets 2 have a larger diameter than those of the lower roller sets 2 because the noodle strip is thicker at the top of the apparatus than at the bottom or base.

A hopper 5 for guiding the noodle material is secured to the top of the base frame 1.

Figure 2:
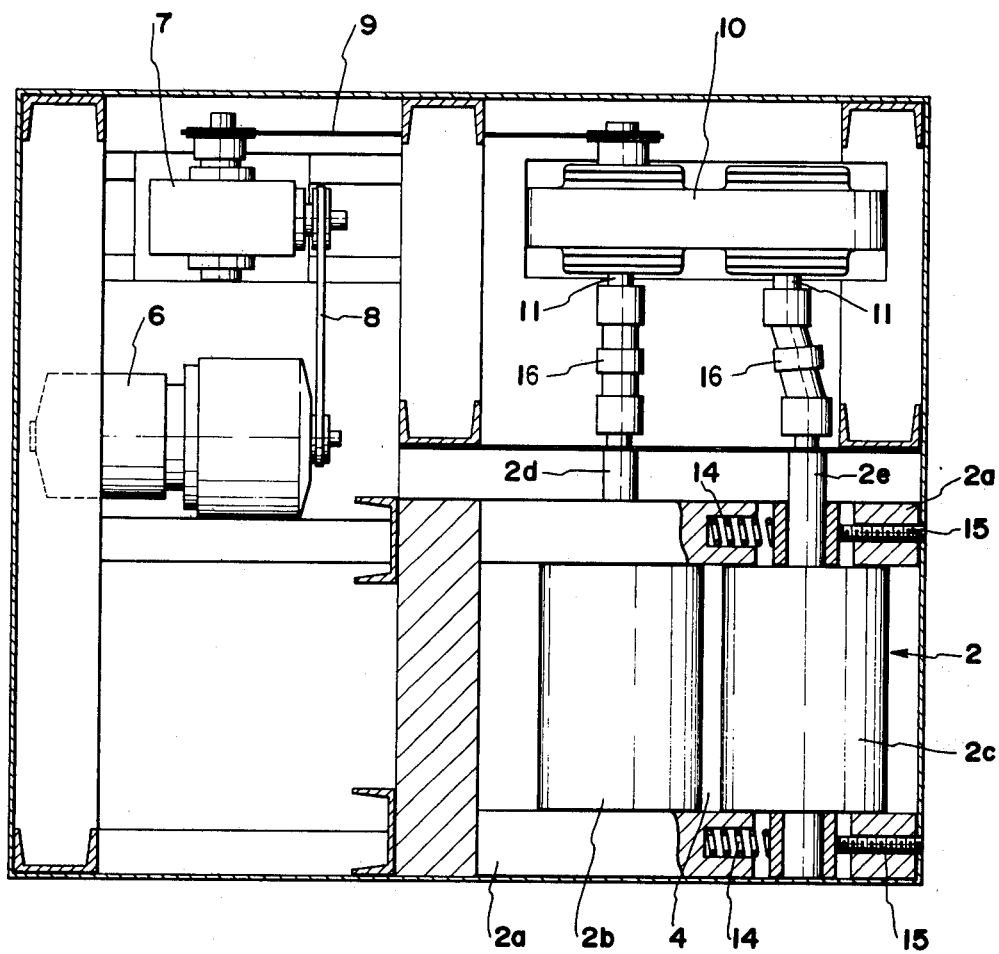
FIG. 2 is a sectional view, partly in cross-section, taken along line 2—2 of FIG. 1.

Speed control means or drive motors 6 are associated with each roller set 2. The drive motors 6 are secured to the base frame 1. Each drive motor 6 includes a transmission 7. Each drive motor 6 is coupled via a V-belt 8 to the associated transmission 7. Each transmission 7 is, in turn, coupled, via a sprocket chain 9, to a timing gear box 10. (FIG. 2)

The timing gear box 10 has a pair of drive shafts 11 coupled via, respective, universal joints 16 to the roller shafts 2d and 2e, respectively, of the associated roller set 2. Sagging detection means or sensors, generally denoted at 12, detect the distance up to the noodle strip. The detection means 12, employs either a photoelectric tube of electromagnetic wave, in a known manner. Each detection means is disposed between adjacent roller sets and is used to control the speed of the lower of the roller sets associated therewith.

The output from the sagging detection means 12 is coupled through a suitable electric circuit for controlling the speed control means or drive motor 6, including the transmission. A control box 13 is connected through a suitable electric circuit to each drive motor 6 and sagging detection means 12 to provide interconnection therebetween.

In order to adjust the roller gap 4 between the roller pairs 2b and 2c, the roller shaft 2e of the roller 2c is outwardly biased by a biassing means, such as a spring 14, against threadably adjustable members, such as bolts 15. By rotationally manipulating the bolts 15, the roller shaft 2e can be shifted for adjustment of the roller gap 4 between the rollers. Since the roller shafts 2d and 2e are coupled via universal joints 16 to the drive shafts 11, the adjustment of the roller gap 4 can be freely made without the rotational speed of the rollers 2b and 2c influencing the adjustment.

By feeding the noodle material to such rolling apparatus through the hopper 5, the material is rendered into the form of a strip of the largest thickness by the uppermost roller set 2. The noodle strip is downwardly emerging from the uppermost roller set is led into the gap 4 between the rollers 2b and 2c of the next roller set 2 for further rolling. At this time, the noodle strip a is always guided by the periphery of the roller 2b or 2c. Thus, the tip of the noodle strip a is naturally guided and requires no manipulation as it enters the successive roller gap 4, and the noodle strip a is satisfactorily guided during its rolling by the roller periphery without any possibility of it enntering the roller gap 4 in a folded state, even if it sags slightly.

This effect is not seen in the rolling of other materials having greater rigidity, for instance in the rolling of metals. This effect is peculiar to the noodle strip which can descent directly downward by its own weight.

The aforedescribed embodiment of the invention is by no means limitative, and various changes and modifications in the design are possible without departing from the scope of the invention.

I claim:

1. An apparatus for noodle rolling comprising:
    a. a housing,
    b. a plurality of roller sets disposed in the housing, each set being vertically arranged one below the other, each roller set comprising a pair of spaced apart rollers, the rollers of each set being spaced apart a distance sufficient to provide a gap therebetween,
    c. a shaft for each roller, each roller being rotatably mounted on its associated shaft,
    d. means operative to drive the shafts,
    e. speed control means for each roller set, the speed control means controlling said driving means for setting the peripheral feed speed of the rollers in relation to the rollers of the other roller sets,
    f. means operable to sense sagging of the noodle strip as it emerges from between a roller set and enters into the next lower roller set, the means being disposed between adjacent roller sets and being operatively connected to an associated speed control means, and
    wherein the rollers of each pair are spaced apart a predetermined distance such that the space between such pairs progressively decreases along the vertical descent of the sets and further wherein the gap between any one roller set is such that it lies within a range corresponding to the distance between the shafts of the rollers of the immediately spaced below roller set.

2. The apparatus of claim 1, wherein:
    the rollers of the individual roller sets are laterally shifted in a staggered fashion within a range corresponding to the distance between the roller shafts of the rollers of the immediately above roller set so that the noodle strip emerging from the gap of each roller set is first guided onto a roller in the next lower roller set prior to entering the space therebetween.

3. The apparatus according to claim 1, which further comprises:
    a universal joint associated with each shaft on which each roller is mounted, the rollers being coupled to the associated speed control means through the universal joints to permit the displacement of the roller shafts for adjusting the distance of the roller gap.

4. The apparatus according to claim 1 which further comprises:
    means for adjusting the roller gap.

* * * * *